US006301363B1

(12) United States Patent
Mowry, Jr.

(10) Patent No.: US 6,301,363 B1
(45) Date of Patent: Oct. 9, 2001

(54) SECURITY DOCUMENT INCLUDING SUBTLE IMAGE AND SYSTEM AND METHOD FOR VIEWING THE SAME

(75) Inventor: William H. Mowry, Jr., Dayton, OH (US)

(73) Assignee: The Standard Register Company, Dayton, OH (US)

(*) Notice: Subject to any disclaimer, the term of this patent is extended or adjusted under 35 U.S.C. 154(b) by 0 days.

(21) Appl. No.: 09/179,075

(22) Filed: Oct. 26, 1998

(51) Int. Cl.$^{7}$ .................................................. G09C 5/00

(52) U.S. Cl. .................................................. 380/54

(58) Field of Search .......................... 380/51, 54; 283/17, 283/72, 73, 91, 93, 108, 113; 356/71; 359/619, 622, 623, 621

(56) References Cited

U.S. PATENT DOCUMENTS

| | | | |
|---|---|---|---|
| 3,922,074 | 11/1975 | Ikegami et al. . | |
| 4,175,774 | 11/1979 | Tonges et al. . | |
| 4,341,404 | 7/1982 | Morwry, Jr. et al. . | |
| 4,579,370 | 4/1986 | Corwin et al. | 283/72 |
| 4,668,597 | 5/1987 | Merchant | 430/22 |
| 5,034,982 | 7/1991 | Heninger et al. | 380/54 |
| 5,149,140 | 9/1992 | Mowry, Jr. et al. | 283/93 |
| 5,178,418 | 1/1993 | Merry et al. | 283/73 |
| 5,197,765 | 3/1993 | Mowry, Jr. et al. | 283/93 |
| 5,291,243 | 3/1994 | Heckman et al. | 355/201 |
| 5,301,981 | 4/1994 | Nesis | 283/73 |
| 5,303,370 | 4/1994 | Brosh et al. | 380/51 |
| 5,340,159 | 8/1994 | Mowry, Jr. | 283/93 |
| 5,396,559 | 3/1995 | McGrew | 380/54 |
| 5,479,507 | 12/1995 | Anderson | 380/3 |
| 5,487,567 | 1/1996 | Volpe | 283/72 |
| 5,488,664 | 1/1996 | Shamir | 380/54 |
| 5,510,199 | 4/1996 | Martin | 428/690 |
| 5,577,774 | 11/1996 | Morikawa et al. | 283/93 |
| 5,591,527 | 1/1997 | Lu | 428/411.1 |
| 5,601,683 | 2/1997 | Martin | 156/277 |
| 5,611,575 | 3/1997 | Petrie | 283/67 |
| 5,708,717 | 1/1998 | Alasia | 380/51 |
| 5,863,075 | 1/1999 | Rich et al. | 283/94 |

*Primary Examiner*—Tod Swann
*Assistant Examiner*—Matthew Smithers
(74) *Attorney, Agent, or Firm*—Killworth, Gottman, Hagan & Schaeff, L.L.P.

(57) ABSTRACT

A system for viewing a subtle image on a security document is provided including a security document, a document viewer, and a document receiving station. The security document comprises a subtle image and a security image formed on a first face of the security document, wherein security image elements are arranged in a security image element array and complementary security image elements are arranged in a complementary security image element array. The subtle image comprises a plurality of subtle image elements arranged in a subtle image element array. The subtle image element array is arranged in a pattern that is optically distinct from respective patterns of arrangement of the security image element array and the complementary security image element array. The document viewer comprises a plurality of lens elements arranged in a lens element array, wherein the plurality of lens elements define a document viewer focal plane, and the lens elements within the lens element array are arranged to render the subtle image readily apparent to the naked eye by enhancing the appearance of the subtle image elements relative to the security image elements and the complementary security image elements and by degrading the appearance of the security image elements and the complementary security image elements relative to the subtle image elements. The document receiving station is positioned to receive the document such that the document may be positioned substantially in the document viewer focal plane.

34 Claims, 4 Drawing Sheets

SECURITY DOCUMENT INCLUDING SUBTLE IMAGE AND SYSTEM AND METHOD FOR VIEWING THE SAME

BACKGROUND OF THE INVENTION

The present invention relates to security documents including a security image composed of individual security image elements and complementary security image elements. When an attempt is made to duplicate or reproduce a document on which the security image is present, at least some of the security image elements change their appearance on the intended duplicate document, or are altered with respect to some other physical characteristic on the intended duplicate or reproduced document. The change in appearance, or the altered physical characteristic, of the elements is utilized to provide an indication that an attempt has been made to duplicate the document.

For example, the security image elements and the complementary security image elements are designed such that, upon the attempted duplication, e.g., by photocopying, either the security image elements or the complementary security image elements are altered while the others remain substantially the same. The elements are arranged such that the attempted duplication results in the formation of a readily apparent warning image on the face of the document. Specifically, when an attempt is made to copy the document, the word "VOID" may appear on the duplicate document. Further, the security image elements and the complementary security image elements are arranged such that the presence of the security image and the security image elements is not readily apparent on the original. Examples of security documents of this type are illustrated in U.S. Pat. Nos. 4,579,370, 5,149,140, 5,197,765, 5,340,159, the disclosures of which are incorporated herein by reference.

The above-described prior art provides a means by which a person charged with the responsibility of reviewing security documents can identify documents that are unauthorized copies of the original security document. However, despite the advantages of the conventional security documents there is a continuing demand in the security document industry for improved security documents and improved systems and methods for validating security documents.

BRIEF SUMMARY OF THE INVENTION

This continuing demand is met by the present invention wherein an improved system and method for viewing a subtle image on a security document and an improved security document including a subtle image are provided. The above reference to one type of conventional security document is not intended to limit the scope or application of the present invention to a specific type of security document. Rather, for the purposes of defining and describing the present invention, it should be understood that security image elements and complementary security image elements according to the present invention are any printed elements that function to provide an indication that an attempt has been made to duplicate or reproduce an original security document. The attempted duplication or reproduction could be through conventional or state of the art photocopying methods (analog, digital, color, black-and-white, etc.), printing methods (ink jet, laser, etc.), publishing methods, etc.

In accordance with one embodiment of the present invention, a system for viewing a subtle image on a security document is provided comprising a security document, a document viewer, and a document receiving station. The security document includes a subtle image formed on a first face of the document, wherein the subtle image is formed by a set of security image elements and a set of complementary security image elements, one of the set of security image elements and the set of complementary security image elements is not readily duplicated by a photocopier at a predetermined photocopier setting, while the other of the set of security image elements and the set of complementary security image elements is readily duplicated by the photocopier at the predetermined photocopier setting, the security image elements are arranged in a security image element array characterized by a first element array frequency $f_1$, and the complementary security image elements are arranged in a complementary security image element array characterized by a second element array frequency $f_2$. The document viewer comprises a plurality of lens elements arranged in a lens element array, wherein the plurality of lens elements define a document viewer focal plane, and the lens element array is characterized by a lens element array frequency $f_0$, where $f_0$, $f_1$, and $f_2$ satisfy at least one of the following document characteristic equations $$f_1 \equiv af_0$$

$$f_2 \equiv bf_0$$

$$f_0 \equiv cf_1$$

$$f_0 \equiv df_2$$

where a, b, c, and d are positive whole numbers and where a b and c d. The document receiving station is positioned to receive the document such that the document may be positioned substantially in the document viewer focal plane. The subtle image may comprise a repetitive array of warning terms.

Preferably, $f_0$, $f_1$, and $f_2$ satisfy at least two of the document characteristic equations. The lens element array frequency $f_0$ may be substantially equal to a selected one of the first element array frequency $f_1$ and the second element array frequency $f_2$. Either the first element array frequency $f_1$ or the second element array frequency $f_2$ may be greater than the other of the first element array frequency $f_1$ and the second element array frequency $f_2$. The lens element array frequency $f_0$ is preferably substantially equal to the lesser of the first element array frequency $f_1$ and the second element array frequency $f_2$.

The document receiving station may be arranged to receive the document such that a selected one of the security image element array and the complementary security image element array is oriented along a first angle relative to the document receiving station and wherein the lens element array is oriented along the first angle. A selected one of the security image element array and the complementary security image element array may be oriented at a first angle relative to a longitudinal dimension of the document and the document receiving station may be positioned to receive the document such that the lens element array is oriented along the first angle relative to the longitudinal dimension of the document. The lens element array frequency $f_0$ may be substantially equal to the element array frequency of the selected element array.

The security image element array and the complementary security image element array may be oriented at different angles relative to a longitudinal dimension of the document. The lens element array may comprise a succession of lens elements spaced adjacent one another at the lens element array frequency $f_0$. Respective ones of the lens elements may have a longitudinal dimension and a partially convex cross section perpendicular to the longitudinal dimension, wherein the cross section is substantially uniform along the longitudinal dimension.

In accordance with another embodiment of the present invention, a method of viewing a subtle image on a security document is provided comprising the steps of: identifying a security document comprising a subtle image formed on a first face of the security document, wherein the subtle image is formed by a set of security image elements and a set of complementary security image elements, one of the set of security image elements and the set of complementary security image elements is not readily duplicated by a photocopier at a predetermined photocopier setting, while the other of the set of security image elements and the set of complementary security image elements is readily duplicated by the photocopier at the predetermined photocopier setting, the security image elements are arranged in a security image element array characterized by a first element array frequency $f_1$, and the complementary security image elements are arranged in a complementary security image element array characterized by a second element array frequency $f_2$; providing a document viewer comprising a plurality of lens elements arranged in a lens element array, wherein the plurality of lens elements define a document viewer focal plane and the lens element array is characterized by a lens element array frequency $f_0$, where $f_0$, $f_1$, and $f_2$ satisfy at least one of the following document characteristic equations $$f_1 \equiv af_0$$

$$f_2 \equiv bf_0$$

$$f_0 \equiv cf_1$$

$$f_0 \equiv df_2$$

where a, b, c, and d are positive whole numbers and where a b and c d; and positioning the document and the document viewer relative to one another such that the document lies substantially in the document viewer focal plane.

In accordance with yet another embodiment of the present invention, a system for viewing a subtle image on a security document is provided comprising a security document, a document viewer, and a document receiving station. The security document comprises a subtle image and a security image formed on a first face of the security document, wherein security image elements are arranged in a security image element array and complementary security image elements are arranged in a complementary security image element array. The subtle image comprises a plurality of subtle image elements arranged in a subtle image element array. The subtle image element array is arranged in a pattern that is optically distinct from respective patterns of arrangement of the security image element array and the complementary security image element array. The document viewer comprises a plurality of lens elements arranged in a lens element array, wherein the plurality of lens elements define a document viewer focal plane, and the lens elements within the lens element array are arranged to render the subtle image readily apparent to the naked eye by enhancing the appearance of the subtle image elements relative to the security image elements and the complementary security image elements and by degrading the appearance of the security image elements and the complementary security image elements relative to the subtle image elements. The document receiving station is positioned to receive the document such that the document may be positioned substantially in the document viewer focal plane.

The lens elements within the lens element array may be arranged to enhance the appearance of the subtle image elements by creating either a substantially positive image of the subtle image elements relative to the security image elements and the complementary security image elements or a substantially negative image of the subtle image elements relative to the security image elements and the complementary security image elements.

The security image element array may be characterized by a first element array frequency $f_1$, the complementary security image element array may be characterized by a second element array frequency $f_2$, and the subtle image element array may be characterized by a subtle image element array frequency $f_3$. The subtle image element array frequency $f_3$ may have a value that differs substantially from the first element array frequency $f_1$ and the second element array frequency $f_2$. The lens element array may be characterized by a lens element array frequency $f_0$, where $f_0$ and $f_3$ satisfy at least one of the following equations $$f_3 \equiv af_0$$

$$f_0 \equiv bf_3$$

where a and b are positive whole numbers. The first element array frequency $f_1$, the second element array frequency $f_2$, and the subtle image element array frequency $f_3$ preferably satisfy the following document characteristic equations $$f_3 < f_1$$

$$f_3 < f_2.$$

In accordance with yet another embodiment of the present invention, a method of viewing a subtle image on a security document is provided comprising the steps of: identifying a security document comprising a subtle image and a security image formed on a first face of the security document, wherein the security image comprises a set of security image elements and a set of complementary security image elements arranged in respective element arrays, the subtle image comprises a plurality of subtle image elements arranged in a subtle image element array arranged in a pattern that is optically distinct from respective patterns of arrangement of the security image element array and the complementary security image element array; providing a document viewer comprising a plurality of lens elements arranged in a lens element array, wherein the plurality of lens elements define a document viewer focal plane and the lens elements within the lens element array are arranged to render the subtle image readily apparent to the naked eye by enhancing the appearance of the subtle image elements relative to the security image elements and the complementary security image elements and by degrading the appearance of the security image elements and the complementary security image elements relative to the subtle image elements; and positioning the document and the document viewer relative to one another such that the document lies substantially in the document viewer focal plane.

In accordance with yet another embodiment of the present invention, a security document is provided comprising a subtle image and a security image formed on a first face of the security document. The security image comprises a set of security image elements and a set of complementary security image elements. One of the set of security image elements and the set of complementary security image elements is not readily duplicated by a photocopier at a predetermined photocopier setting, while the other of the set of security image elements and the set of complementary security image elements is readily duplicated by the photocopier at the predetermined photocopier setting. The security image elements are arranged in a security image element array characterized by a first element array frequency $f_1$. The complementary security image elements are arranged in a complementary security image element array characterized by a second element array frequency $f_2$. The subtle image comprises a plurality of subtle image elements arranged in a subtle image element array characterized by a subtle image element array frequency $f_3$. The subtle image element array frequency $f_3$ has a value that differs substantially from the first element array frequency $f_1$ and the second element array frequency $f_2$, whereby, upon viewing the document with a document viewer having a plurality of lens elements arranged in a lens element array, the subtle image is rendered readily apparent relative to the security image.

The first element array frequency $f_1$ may have a value that differs substantially from the second element array frequency $f_2$. The subtle image element array and at least one of the security image element array and the complementary security image element array may be oriented at different angles relative to a longitudinal dimension of the document. Further, the security image element array, the complementary security image element array, and the subtle image element array may be oriented at different angles relative to a longitudinal dimension of the document.

The first element array frequency $f_1$, the second element array frequency $f_2$, and the subtle image element array frequency $f_3$ may satisfy the following document characteristic equations $$f_3<f_1$$

$$f_3<f_2$$

whereby a lens element array characterized by a lens element array frequency $f_0$, where $f_0 \equiv af_3$ and where a is a positive whole number, may be arranged to enhance the appearance of the subtle image relative to the security image element array and the complementary security image element array.

The subtle image may be arranged to camouflage the security image or the security document may comprise a camouflage image formed on the first face of the security document. The subtle image may be formed in a selected portion of the first face. The subtle image and the security image may be formed in a common area of the first face.

In accordance with yet another embodiment of the present invention, a security document is provided comprising a subtle image and a security image formed on a first face of the security document. The security image comprises a set of security image elements and a set of complementary security image elements. One of the set of security image elements and the set of complementary security image elements is not readily duplicated by a photocopier at a predetermined photocopier setting, while the other of the set of security image elements and the set of complementary security image elements is readily duplicated by the photocopier at the predetermined photocopier setting. The security image elements are arranged in a security image element array. The complementary security image elements are arranged in a complementary security image element array. The subtle image comprises a plurality of subtle image elements arranged in a subtle image element array. The subtle image element array is arranged in a pattern that is optically distinct from respective patterns of arrangement of the security image element array and the complementary security image element array, such that an optical element may be arranged to render the subtle image readily apparent to the naked eye by enhancing the appearance of the subtle image elements relative to the security image elements and the complementary security image elements and by degrading the appearance of the security image elements and the complementary security image elements relative to the subtle image elements.

In accordance with yet another embodiment of the present invention, a security document processing system is provided comprising a document issuing station and at least one document receiving station, wherein said at least one document receiving station comprises a system for viewing a subtle image on a security document according to the present invention.

Accordingly, it is an object of the present invention to provide an improved system and method for viewing a subtle image on a security document and to provide an improved security document including a subtle image. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 2:
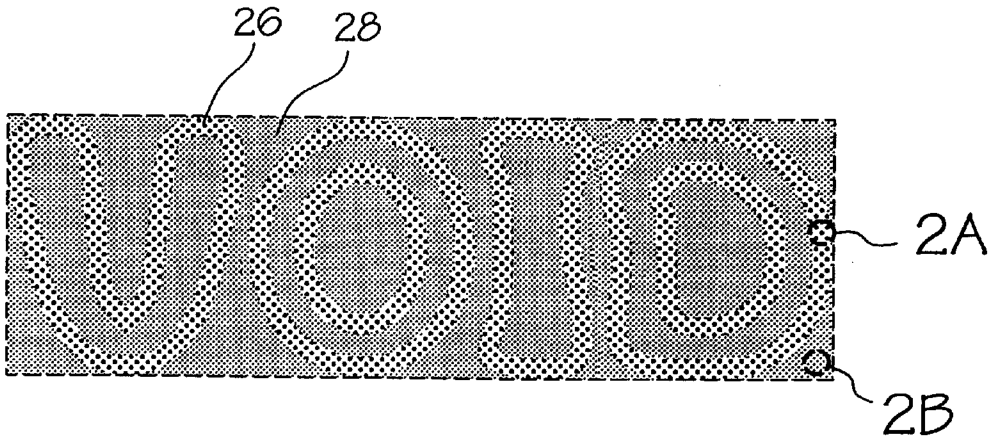
FIGS. 2, 2A, and 2B are schematic illustrations of a set of security image elements and a set of complementary security image elements arranged in a common image area according to the present invention.
Figure 2A:
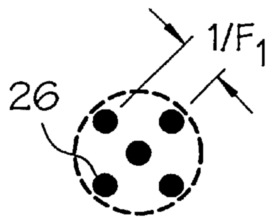
Figure 2B:
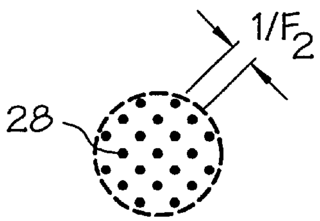

Referring collectively to FIGS. 1–5, a subtle image viewing system 10 according to the present invention illustrated. The viewing system 10 comprises a security document 20, a document viewer 30, and a document receiving station 40. The security document 20 comprises a subtle security image 22 formed on a first face 24 of the document 20. The subtle security image 22 is formed by a set of security image elements 26, e.g., big dots, and a set of complementary security image elements 28, e.g., small dots (see FIGS. 2–4). As is illustrated in FIGS. 2, 2A, and 2B, the security image elements 26 are arranged in a security image element array characterized by a first element array frequency $f_1$ and the complementary security image elements 28 are arranged in a complementary security image element array characterized by a second element array frequency $f_2$. Where the security image elements 26 are big dots and the complementary security image elements 28 are small dots, the image elements 26, 28 are sized and arranged such that the complementary security image elements 28 are not readily duplicated by a photocopier at a predetermined photocopier setting, while the security image elements 26 are readily duplicated by the photocopier at the predetermined photocopier setting. It is contemplated by the present invention, however, that if image elements other than big dots and small dots are utilized on the face 24 of the security document 20, that either the set of security image elements or the set of complementary security image elements can be designed or arranged so as not to be readily duplicated by a photocopier at a predetermined photocopier setting, while the other set of elements is designed or arranged so as to be readily duplicated by the photocopier at the predetermined photocopier setting.

Figure 3:
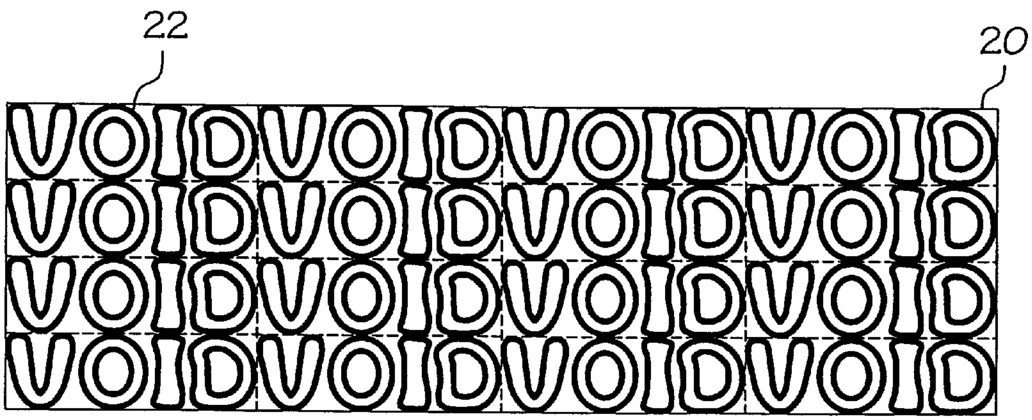
FIG. 3 is a schematic illustration of a security document according to the present invention.

The general arrangement of the subtle security image 22 on the document 20 is illustrated schematically in FIG. 3. To the naked eye, the subtle security image 22 is not readily apparent on the document 20 because the security image elements 26 and the complementary security image elements 28 are arranged in substantially equal tones or densities. However, as is described in detail herein, when the security document 20 is positioned in the document receiving station 40 and viewed through the viewer 30, the subtle security image 22 becomes readily apparent.

Figure 1:
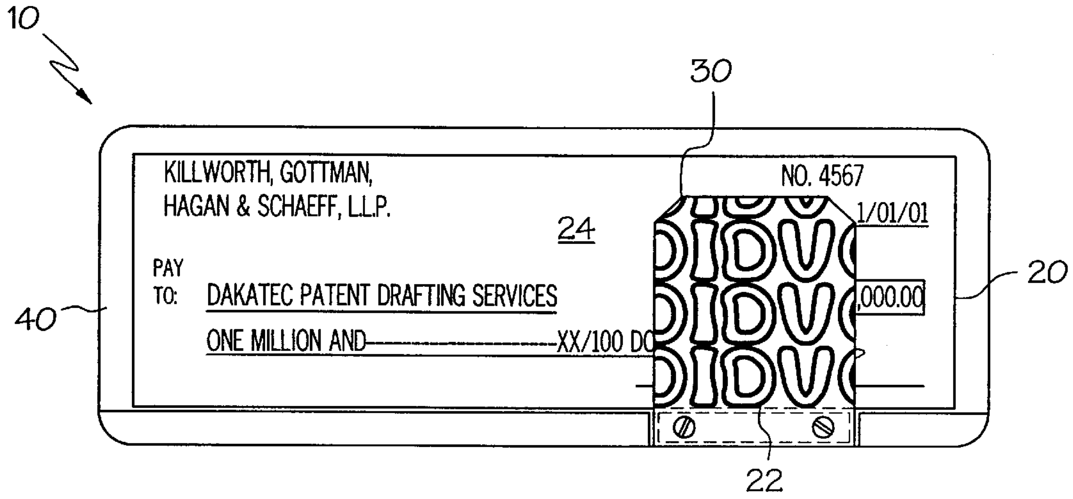
FIG. 1 is a schematic illustration of a system for viewing a subtle image on a security document according to the present invention.
Figure 4:
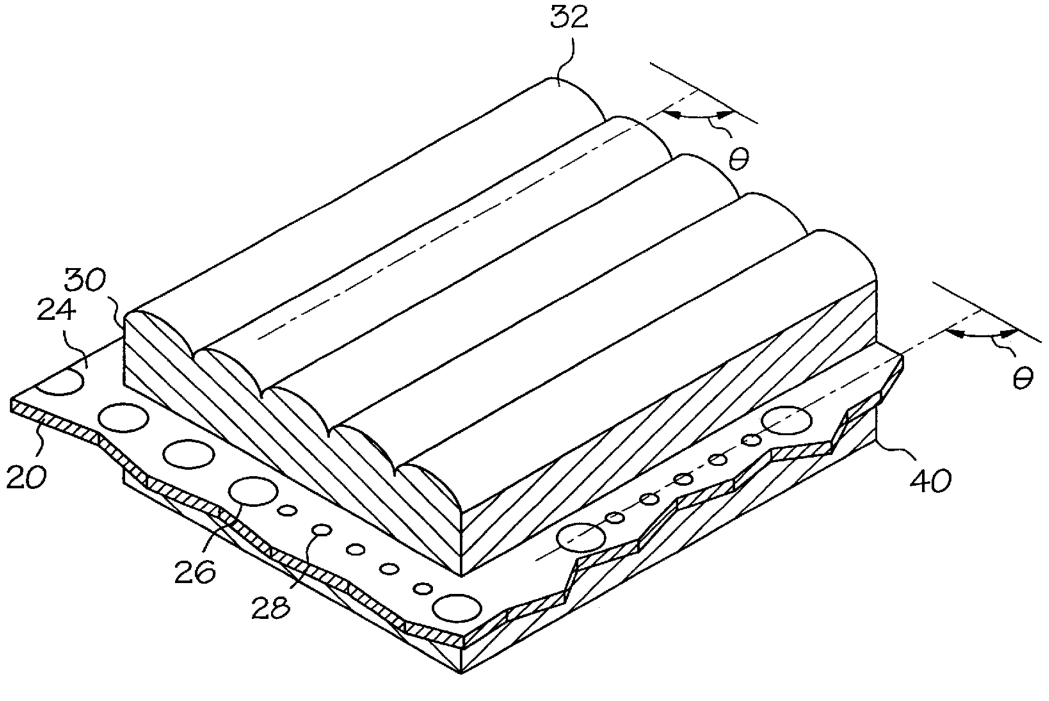
FIG. 4 is an illustration, partially in cross section and partially broken away, of the system of FIG. 3.
Figure 5:
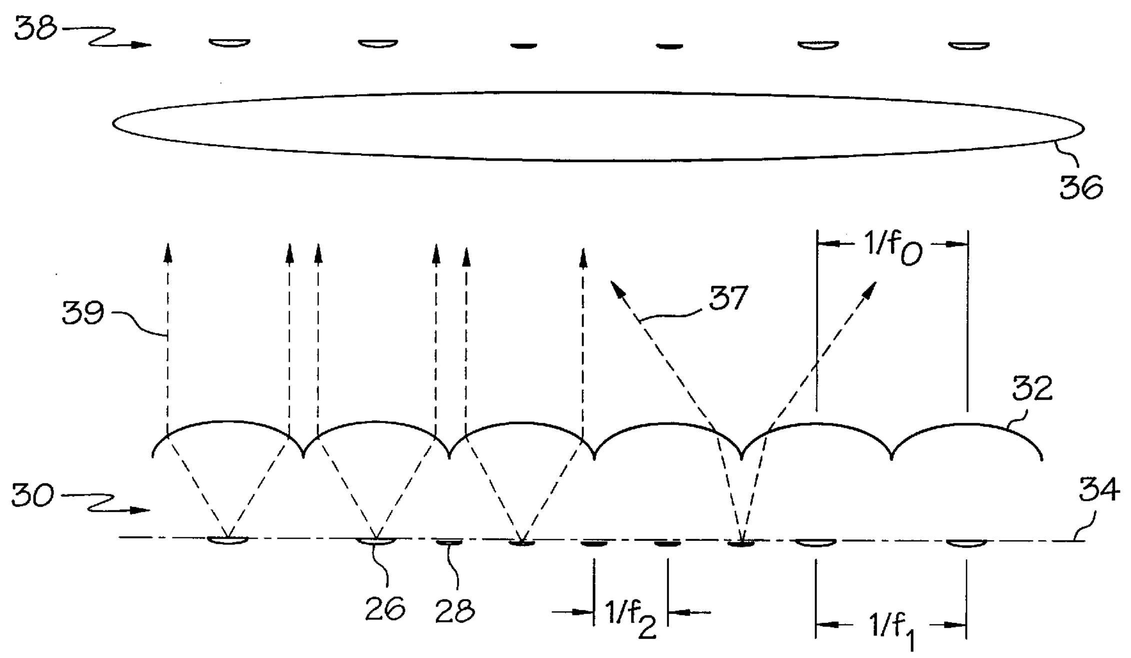
FIG. 5 is a schematic illustration of the operation of the subtle image viewing system of the present invention.

As is illustrated in FIGS. 4 and 5, the document viewer 30 comprises a plurality of lens elements 32 arranged in a lens element array. The plurality of lens elements 32 define a document viewer focal plane 34. The document receiving station 40 is positioned to receive the document 20 such that the document 20 may be positioned substantially in the document viewer focal plane 34.

The lens element array is characterized by a lens element array frequency $f_0$. The variables $f_0$, $f_1$, and $f_2$ are established such that at least one of the following document characteristic equations is satisfied $$f_1 \equiv af_0 \quad (1)$$

$$f_2 \equiv bf_0 \quad (2)$$

$$f_0 \equiv cf_1 \quad (3)$$

$$f_0 \equiv df_2 \quad (4)$$

where a, b, c, and d are positive whole numbers and where a b and c d. Preferably, $f_0$, $f_1$, and $f_2$ satisfy at least two of the document characteristic equations. It is apparent that equations (1) and (3) cannot both be satisfied by a single arrangement and that equations (2) and (4) cannot both be satisfied by a single arrangement. For the purposes of describing and defining the present invention, it is noted that the symbols ≡ and denote values that are substantially equal and not substantially equal, respectively.

An arrangement that would satisfy equations (1) and (2) is illustrated in FIG. 5, where a=1 and b=2. An arrangement satisfying equations (3) and (4) is similar to that illustrated in FIG. 5, with the exception that the lens elements may be more frequent than the security image elements 26 and the complementary security image elements 28. With a=1 and with equation (1) satisfied, each of the security image elements 26 can be simultaneously aligned in substantially the same position relative to the associated lens element 32, preferably at or near the focal point of the associated lens element (see FIG. 5). With b=2 and with equation (2) satisfied, half of the complementary security image elements 28 can be simultaneously aligned in substantially the same position relative to the associated lens element 32, preferably offset from the focal point of the associated lens element (see FIG. 5). Aligning the security document 20 and the image elements 26, 28 in this manner, the subtle security image 22 may be rendered readily apparent. Specifically, the security document 20 is arranged in the document receiving station 40 such that substantially all of the security image elements 26 within the area of the viewer 30 are aligned with respective lens elements 32 in the document viewer 30 and such that merely one-half of the complementary image elements 28 in the same area are aligned with the focal points of the respective lens elements 32 in the lens element array. The resulting output image 38 is illustrated schematically in FIG. 5, where the non-parallel optical projections 37 represent an image element that will not be present in the output image 38 and the parallel optical projections 39 represent an image element that will be present in the output image 38. The security image elements 26 become substantially more pronounced relative to the complementary security image elements 28 in the output image 38, when viewed through the document viewer 30 and a lens 36 representing, for example, the human eye. Stated differently, the overall tone or density of the complementary security image elements 28 is degraded while the overall tone or density of the security image elements 26 is preserved. As a result, the printed matter on the face of the security document 20 no longer appears as an even tone, and the subtle security image 22, i.e., the word "VOID," which ordinarily is not readily apparent on the face 24 of the security document 20 becomes readily apparent on the face 24 of the document 20. Similar results could be obtained with c established as a positive whole number and with equation (3) satisfied and with d established as a different positive whole number and with equation (4) satisfied.

According to the illustrated embodiment, the subtle security image 22 is rendered readily apparent by selecting the frequency of the lens elements 32, commonly referred to as a lenticular lens sheet, and the frequency of the security image elements 26 and the complementary security image elements 28 such that the subtle security image 22 becomes more readily apparent on the face 24 of the document 20. It is contemplated by the present invention, however, that a variety of additional techniques may be utilized to render the subtle security image 22 readily apparent by enhancing the appearance of the security image elements 26 or degrading the appearance of the complementary security image elements 28 when viewed through the document viewer 30. As will be appreciated by those practicing the present invention, the security image elements 26 and the complementary security image elements 28 may be selected from a group consisting of lines, dots, non-uniform geometric shapes, and combinations thereof.

It is further contemplated by the present invention that the lens elements 32 can be oriented in a non-linear fashion as long as the security image elements 26 and the complementary security image elements 28 are arranged in a manner that enables the lens elements 32 to enhance the appearance of the security image elements 26 or degrade the appearance of the complementary security image elements 28 when viewed through the document viewer 30. For example, the lens elements 32 can form a pattern of concentric circles.

To enhance the effectiveness of the subtle image viewing system of the present invention, the document receiving station 40 is arranged to receive the document 20 such that either the security image element array or the complementary security image element array is oriented along an angle θ relative to the document receiving station. Further, the lens elements 32 are oriented along substantially the same first angle θ. In this manner, the particular image elements to be rendered more readily apparent by the viewer 30 may be conveniently aligned with the lens elements 32. Additionally, the particular image elements to be rendered less readily apparent by the viewer 30 may be oriented at an angle that is different that the first angle θ.

Figure 6:
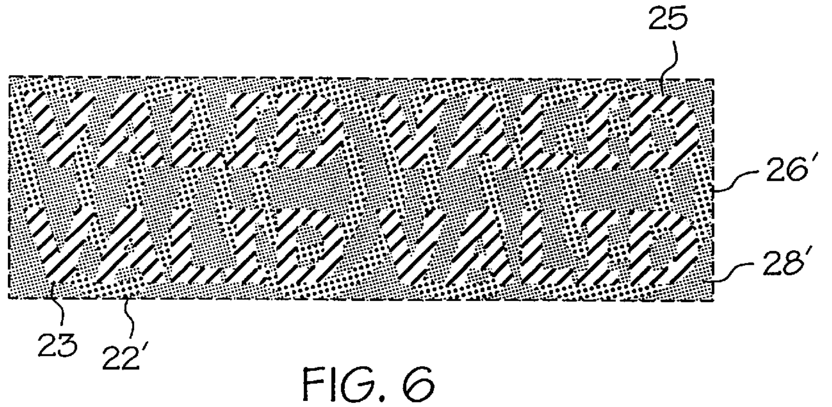
FIG. 6 is an illustration of a security document of the present invention.
Figure 7:
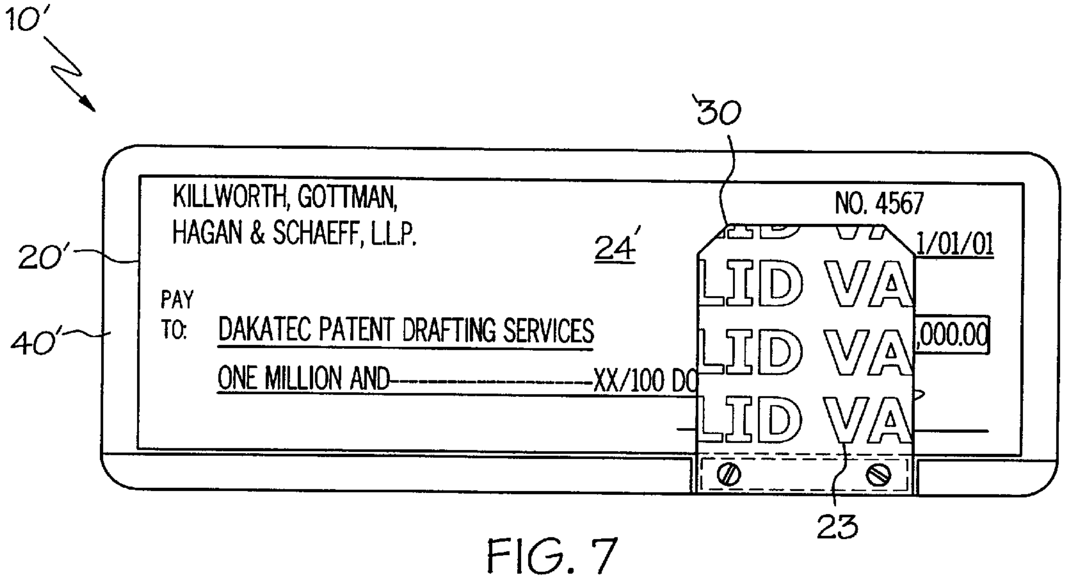
FIG. 7 is a schematic illustration of a system for viewing a subtle image on a security document according to the present invention.

Referring now to FIGS. 6 and 7, an alternative embodiment of the present invention is illustrated. In this embodiment, the security document 20' comprises a subtle image 23, e.g., "VALID," in addition to the subtle security image 22', e.g., "VOID." As is the case for the embodiment of FIGS. 1–5, the security image 22' comprises a set of security image elements 26' and a set of complementary security image elements 28'. Either the set of security image elements 26' and the set of complementary security image elements 28' is designed so as to be not readily duplicated by a photocopier at a predetermined photocopier setting while the other set of elements is readily duplicated at the predetermined photocopier setting.

The subtle image 23 comprises a plurality of subtle image elements 25, e.g., lines, dots, non-uniform geometric shapes, and combinations thereof, arranged in a subtle image element array. The subtle image elements 25 are merely illustrated schematically in FIG. 6 and are designed such that the subtle image 23 is not readily apparent on the face 24' of the document 20' because it "blends-in" with the other printed matter on the document. Specifically, the subtle image 23 may be arranged to have and overall tone or density on the document that matches the tone of the security image elements 26' and the complementary security image elements 28'. In addition, the subtle image 23 and the security image 22' may be disguised with a conventional camouflage image (not shown).

The subtle image element array is arranged in a pattern that is optically distinct from respective patterns of arrangement of the security image element array and the complementary security image element array. The document viewer 30' includes a plurality of lens elements arranged to render the subtle image 23 readily apparent to the naked eye by enhancing the appearance of the subtle image elements 25 relative to the security image elements 26' and the complementary security image elements 28' and by degrading the appearance of the security image elements 26' and the complementary security image elements 28' relative to the subtle image elements 25. For example, the document viewer 30' may be arranged to enhance the appearance of the subtle image elements by creating either a substantially positive image of the subtle image elements relative to the security image elements and the complementary security image elements or a substantially negative image of the subtle image elements relative to the security image elements and the complementary security image elements.

The described positive and negative images may be created by selecting appropriate element array frequencies and orientations for the respective element arrays. Specifically, in one embodiment, the security image element array is characterized by a first element array frequency $f_1$, the complementary security image element array is characterized by a second element array frequency $f_2$, and the subtle image element array is characterized by a subtle image element array frequency $f_3$. The subtle image element array frequency $f_3$ has a value that differs substantially from the first element array frequency $f_1$ and the second element array frequency $f_2$. The lens element array is characterized by a lens element array frequency $f_0$, where $f_0$ and $f_3$ satisfy at least one of the following equations $$f_3 \cong af_0 \tag{5}$$

$$f_0 \cong bf_3 \tag{6}$$

where a and b are positive whole numbers. In this manner, with a and b established as positive whole numbers and with equation (5) or equation (6) satisfied, a plurality of subtle image elements 25 can be simultaneously aligned in substantially the same position relative to the associated lens element 32, preferably at or near the focal point of the associated lens element, as described above with reference to FIGS. 4 and 5. Accordingly, when the security document is properly aligned in the document receiving station 40', the subtle image 23 will be rendered readily apparent relative to the security image 22' when viewed through the document viewer 30'.

The effectiveness of the subtle image viewing system 10' illustrated in FIGS. 6 and 7 may be improved by ensuring that the first element array frequency $f_1$ has a value that differs substantially from the second element array frequency $f_2$. Further, the subtle image element array and one or both of the security image element array and the complementary security image element array may be oriented at different angles relative to a longitudinal dimension of the document 20'. In addition, the first element array frequency $f_1$, the second element array frequency $f_2$, and the subtle image element array frequency $f_3$ satisfy the following document characteristic equations $$f_3 < f_1 \tag{7}$$

$$f_3 < f_2. \tag{8}$$

It is noted that the subtle image 23 may merely be formed in a selected portion of the first face 24'. Alternatively, the subtle image 23 and the security image 22' may both be formed entirely in a common area of the first face 24', in entirely different areas of the first face 24', or over the entire extent of the first face 24'.

Figure 8:
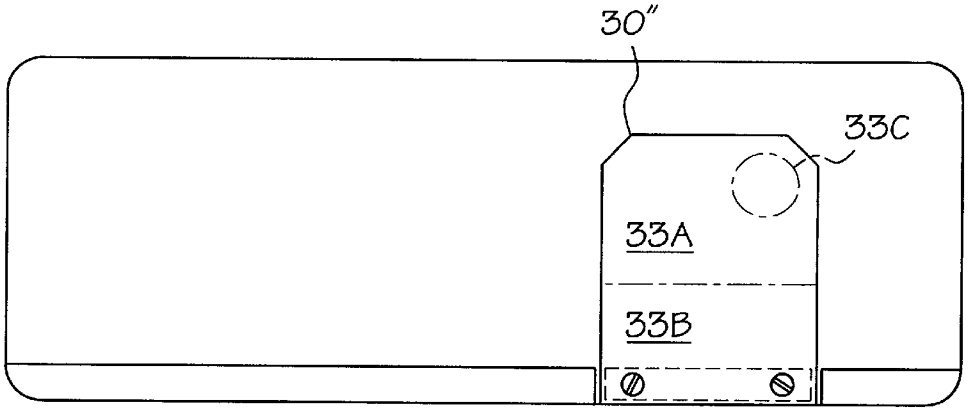
FIG. 8 is a schematic illustration of an alternative document viewer according to the present invention.
Figure 9:
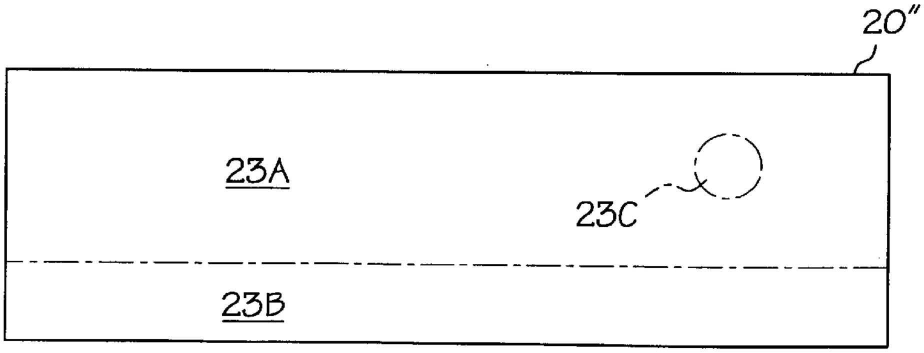
FIG. 9 is a schematic illustration of an alternative security document according to the present invention.

Referring now to FIGS. 8 and 9, additional features of the present invention are illustrated schematically. Specifically, an alternative document viewer 30" is illustrated in FIG. 8. The document viewer 30" comprises distinct lens element portions 33A, 33B, 33C. Each of the distinct lens element portions 33A, 33B, 33C is designed in the same general manner as described above with respect to the lens elements 32 of the document viewers 30 and 30'. However, in the embodiment of FIG. 8, the lens element portions 33A, 33B, 33C are designed to have distinct array frequencies or orientations such that they are uniquely suited for decoding or viewing corresponding portions of the security document 20". The security document 20" comprises distinct subtle image portions 23A, 23B, 23C. Each of the distinct subtle image portions 23A, 23B, 23C is designed to be compatible with a corresponding one of the distinct lens element portions 33A, 33B, 33C, in the manner described above with respect to the security documents 20 and 20' (see FIGS. 1–7). The respective subtle image portions 23A, 23B, 23C and the corresponding distinct lens element portions 33A, 33B, 33C are arranged such that the image within each of the subtle image portions 23A, 23B, 23C can be made readily apparent to the naked eye by aligning the respective subtle image portions 23A, 23B, 23C with the corresponding lens element portions 33A, 33B, 33C.

For the purposes of describing and defining the present invention, where a lens element array frequency is said to be substantially equal to an image element array frequency it should be understood that the associated values are close enough to render the image readily apparent when viewed through the lens element array. Similarly, where a document is said to lie substantially in a document viewer focal plane it should be understood that the document is at least close enough to the focal plane to render an image on the face of the document readily apparent when viewed through the document viewer. Finally, where the subtle image element array frequency is described as having a value which differs substantially from the first element array frequency and the second element array frequency it should be understood that the values differ enough to render the subtle image readily apparent relative to security the security image when viewed through an appropriately designed document viewer.

Having described the invention in detail and by reference to preferred embodiments thereof, it will be apparent that modifications and variations are possible without departing from the scope of the invention defined in the appended claims.

What is claimed is:

1. A system for viewing a subtle image on a security document comprising:

a security document comprising a subtle image formed on a first face of said document, wherein said subtle image is formed by a set of security image elements and a set of complementary security image elements, one of said set of security image elements and said set of complementary security image elements is not readily duplicated by a photocopier at a predetermined photocopier setting, while the other of said set of security image elements and said set of complementary security image elements is readily duplicated by said photocopier at said predetermined photocopier setting, said security image elements are arranged in a security image element array characterized by a first element array frequency $f_1$, and said complementary security image elements are arranged in a complementary security image element array characterized by a second element array frequency $f_2$;

a document viewer comprising a plurality of lens elements arranged in a lens element array, wherein said plurality of lens elements define a document viewer focal plane, and said lens element array is characterized by a lens element array frequency $f_0$, where $f_0$, $f_1$, and $f_2$ satisfy at least one of the following document characteristic equations $$f_1 \equiv a f_0$$

$$f_2 \equiv b f_0$$

$$f_0 \equiv c f_1$$

$$f_0 \equiv d f_2$$

where a, b, c, and d are positive whole numbers and where a b and c d; and a document receiving station positioned to receive said document such that said document may be positioned substantially in said document viewer focal plane.

2. A system for viewing a subtle image on a security document as claimed in claim 1 wherein $f_0$, $f_1$, and $f_2$ satisfy at least two of said document characteristic equations.

3. A system for viewing a subtle image on a security document as claimed in claim 1 wherein said lens element array frequency $f_0$ is substantially equal to a selected one of said first element array frequency $f_1$ and said second element array frequency $f_2$.

4. A system for viewing a subtle image on a security document as claimed in claim 1 wherein one of said first element array frequency $f_1$ and said second element array frequency $f_2$ is greater than the other of said first element array frequency $f_1$ and said second element array frequency $f_2$, and wherein said lens element array frequency $f_0$ is substantially equal to the lesser of said first element array frequency $f_1$ and said second element array frequency $f_2$.

5. A system for viewing a subtle image on a security document as claimed in claim 1 wherein said document receiving station is arranged to receive said document such that a selected one of said security image element array and said complementary security image element array is oriented along a first angle relative to said document receiving station and wherein said lens element array is oriented along said first angle.

6. A system for viewing a subtle image on a security document as claimed in claim 1 wherein a selected one of said security image element array and said complementary security image element array is oriented at a first angle relative to a longitudinal dimension of said document and wherein said document receiving station is positioned to receive said document such that said lens element array is oriented along said first angle relative to said longitudinal dimension of said document.

7. A system for viewing a subtle image on a security document as claimed in claim 6 wherein said lens element array frequency $f_0$ is substantially equal to the element array frequency of said selected element array.

8. A system for viewing a subtle image on a security document as claimed in claim 1 wherein said security image element array and said complementary security image element array are oriented at different angles relative to a longitudinal dimension of said document.

9. A system for viewing a subtle image on a security document as claimed in claim 1 wherein said lens element array comprises a lenticular lens sheet.

10. A system for viewing a subtle image on a security document as claimed in claim 1 wherein said lens element array comprises a succession of lens elements spaced adjacent one another at said lens element array frequency $f_0$.

11. A system for viewing a subtle image on a security document as claimed in claim 10 wherein respective ones of said lens elements have a longitudinal dimension and a partially convex cross section perpendicular to said longitudinal dimension, and wherein said cross section is substantially uniform along said longitudinal dimension.

12. A system for viewing a subtle image on a security document as claimed in claim 1 wherein said lens element array comprises a plurality of distinct lens element portions characterized by respective distinct lens element array frequencies $f_0$.

13. A system for viewing a subtle image on a security document as claimed in claim 12 wherein said distinct lens element portions are positioned to permit simultaneous alignment of said distinct lens element portions with corresponding distinct subtle image portions present on said security document.

14. A system for viewing a subtle image on a security document as claimed in claim 1 wherein said security image elements and said complementary security image elements are selected from a group consisting of lines, dots, non-uniform geometric shapes, and combinations thereof.

15. A system for viewing a subtle image on a security document as claimed in claim 1 wherein said subtle image comprises a repetitive array of warning terms.

16. A method of viewing a subtle image on a security document comprising the steps of:

identifying a security document comprising a subtle image formed on a first face of said security document, wherein said subtle image is formed by a set of security image elements and a set of complementary security image elements, one of said set of security image elements and said set of complementary security image elements is not readily duplicated by a photocopier at a predetermined photocopier setting, while the other of said set of security image elements and said set of complementary security image elements is readily duplicated by said photocopier at said predetermined photocopier setting, said security image elements are arranged in a security image element array characterized by a first element array frequency $f_1$, and said complementary security image elements are arranged in a complementary security image element array characterized by a second element array frequency $f_2$;

providing a document viewer comprising a plurality of lens elements arranged in a lens element array, wherein said plurality of lens elements define a document viewer focal plane and said lens element array is characterized by a lens element array frequency $f_0$, where $f_0$, $f_1$, and $f_2$ satisfy at least one of the following document characteristic equations $$f_1 \equiv af_0$$

$$f_2 \equiv bf_0$$

$$f_0 \equiv cf_1$$

$$f_0 \equiv df_2$$

where a, b, c, and d are positive whole numbers and where a b and c d; and positioning said document and said document viewer relative to one another such that said document lies substantially in said document viewer focal plane.

17. A system for viewing a subtle image on a security document comprising:

a security document comprising a subtle image and a security image formed on a first face of said security document, wherein said security image comprises a set of security image elements and a set of complementary security image elements, one of said set of security image elements and said set of complementary security image elements is not readily duplicated by a photocopier at a predetermined photocopier setting, while the other of said set of security image elements and said set of complementary security image elements is readily duplicated by said photocopier at said predetermined photocopier setting, said security image elements are arranged in a security image element array, said complementary security image elements are arranged in a complementary security image element array, said subtle image comprises a plurality of subtle image elements arranged in a subtle image element array, said subtle image element array is arranged in a pattern that is optically distinct from respective patterns of arrangement of said security image element array and said complementary security image element array;

a document viewer comprising a plurality of lens elements arranged in a lens element array, wherein said plurality of lens elements define a document viewer focal plane, and said lens elements within said lens element array are arranged to render said subtle image readily apparent to the naked eye by enhancing the appearance of said subtle image elements relative to said security image elements and said complementary security image elements and by degrading the appearance of said security image elements and said complementary security image elements relative to said subtle image elements; and a document receiving station positioned to receive said document such that said document may be positioned substantially in said document viewer focal plane.

18. A system for viewing a subtle image on a security document as claimed in claim 17 wherein said lens elements within said lens element array are arranged to enhance the appearance of said subtle image elements by creating one of a substantially positive image of said subtle image elements relative to said security image elements and said complementary security image elements and a substantially negative image of said subtle image elements relative to said security image elements and said complementary security image elements.

19. A system for viewing a subtle image on a security document as claimed in claim 17 wherein:

said security image element array is characterized by a first element array frequency $f_1$;

said complementary security image element array is characterized by a second element array frequency $f_2$;

said subtle image element array is characterized by a subtle image element array frequency $f_3$;

said subtle image element array frequency $f_3$ has a value that differs substantially from said first element array frequency $f_1$ and said second element array frequency $f_2$; and said lens element array is characterized by a lens element array frequency $f_0$, where $f_0$ and $f_3$ satisfy at least one of the following equations $$f_3 \equiv af_0$$

$$f_0 \equiv bf_3$$

where a and b are positive whole numbers.

20. A system for viewing a subtle image on a security document as claimed in claim 19 wherein said first element array frequency $f_1$, said second element array frequency $f_2$, and said subtle image element array frequency $f_3$ satisfy the following document characteristic equations $$f_3 < f_1$$

$$f_3 < f_2.$$

21. A system for viewing a subtle image on a security document as claimed in claim 17 wherein said lens element array comprises a plurality of distinct lens element portions.

22. A system for viewing a subtle image on a security document as claimed in claim 21 wherein said distinct lens element portions are positioned to permit simultaneous alignment of said distinct lens element portions with corresponding distinct subtle image portions present on said security document.

23. A method of viewing a subtle image on a security document comprising the steps of:

identifying a security document comprising a subtle image and a security image formed on a first face of said security document, wherein said security image comprises a set of security image elements and a set of complementary security image elements;

one of said set of security image elements and said set of complementary security image elements is not readily duplicated by a photocopier at a predetermined photocopier setting, while the other of said set of security image elements and said set of complementary security image elements is readily duplicated by said photocopier at said predetermined photocopier setting;

said security image elements are arranged in a security image element array;

said complementary security image elements are arranged in a complementary security image element array;

said subtle image comprises a plurality of subtle image elements arranged in a subtle image element array;

said subtle image element array is arranged in a pattern that is optically distinct from respective patterns of arrangement of said security image element array and said complementary security image element array providing a document viewer comprising a plurality of lens elements arranged in a lens element array, wherein said plurality of lens elements define a document viewer focal plane and said lens elements within said lens element array are arranged to render said subtle image readily apparent to the naked eye by enhancing the appearance of said subtle image elements relative to said security image elements and said complementary security image elements and by degrading the appearance of said security image elements and said complementary security image elements relative to said subtle image elements; and positioning said document and said document viewer relative to one another such that said document lies substantially in said document viewer focal plane.

24. A security document comprising a subtle image and a security image formed on a first face of said security document, wherein:

said security image comprises a set of security image elements and a set of complementary security image elements;

one of said set of security image elements and said set of complementary security image elements is not readily duplicated by a photocopier at a predetermined photocopier setting, while the other of said set of security image elements and said set of complementary security image elements is readily duplicated by said photocopier at said predetermined photocopier setting;

said security image elements are arranged in a security image element array characterized by a first element array frequency $f_1$;

said complementary security image elements are arranged in a complementary security image element array characterized by a second element array frequency $f_2$;

said subtle image comprises a plurality of subtle image elements arranged in a subtle image element array characterized by a subtle image element array frequency $f_3$; and said subtle image element array frequency $f_3$ has a value that differs substantially from said first element array frequency $f_1$ and said second element array frequency $f_2$, whereby, upon viewing said document with a document viewer having a plurality of lens elements arranged in a lens element array, said subtle image is rendered readily apparent relative to said security image.

25. A security document as claimed in claim 24 wherein said first element array frequency $f_1$ has a value that differs substantially from said second element array frequency $f_2$.

26. A security document as claimed in claim 24 wherein said subtle image element array and at least one of said security image element array and said complementary security image element array are oriented at different angles relative to a longitudinal dimension of said document.

27. A security document as claimed in claim 24 wherein said security image element array, said complementary security image element array, and said subtle image element array are oriented at different angles relative to a longitudinal dimension of said document.

28. A security document as claimed in claim 24 wherein said first element array frequency $f_1$, said second element array frequency $f_2$, and said subtle image element array frequency $f_3$ satisfy the following document characteristic equations $$f_3 < f_1$$

$$f_3 < f_2$$

whereby a lens element array characterized by a lens element array frequency $f_0$, where $f_0 \equiv af_3$ and where a is a positive whole number, may be arranged to enhance the appearance of said subtle image relative to said security image element array and said complementary security image element array.

29. A security document as claimed in claim 24 wherein said subtle image is arranged to camouflage said security image.

30. A security document as claimed in claim 24 further comprising a camouflage image formed on said first face of said security document.

31. A security document as claimed in claim 24 wherein said subtle image is formed in a selected portion of said first face.

32. A security document as claimed in claim 24 wherein said subtle image and said security image are formed in a common area of said first face.

33. A security document comprising a subtle image and a security image formed on a first face of said security document, wherein:

said security image comprises a set of security image elements and a set of complementary security image elements;

one of said set of security image elements and said set of complementary security image elements is not readily duplicated by a photocopier at a predetermined photocopier setting, while the other of said set of security image elements and said set of complementary security image elements is readily duplicated by said photocopier at said predetermined photocopier setting;

said security image elements are arranged in a security image element array;

said complementary security image elements are arranged in a complementary security image element array;

said subtle image comprises a plurality of subtle image elements arranged in a subtle image element array;

said subtle image element array is arranged in a pattern that is optically distinct from respective patterns of arrangement of said security image element array and said complementary security image element array, such that an optical element may be arranged to render said subtle image readily apparent to the naked eye by enhancing the appearance of said subtle image elements relative to said security image elements and said complementary security image elements and by degrading the appearance of said security image elements and said complementary security image elements relative to said subtle image elements.

34. A security document processing system comprising a document issuing station and at least one document receiving station, wherein said at least one document receiving station comprises a system for viewing a subtle image on a security document, said system for viewing said subtle image comprising:

a security document comprising a subtle image formed on a first face of said document, wherein said subtle image is formed by a set of security image elements and a set of complementary security image elements, one of said set of security image elements and said set of complementary security image elements is not readily duplicated by a photocopier at a predetermined photocopier setting, while the other of said set of security image elements and said set of complementary security image elements is readily duplicated by said photocopier at said predetermined photocopier setting, said security image elements are arranged in a security image element array characterized by a first element array frequency $f_1$, and said complementary security image elements are arranged in a complementary security image element array characterized by a second element array frequency $f_2$;

a document viewer comprising a plurality of lens elements arranged in a lens element array, wherein said plurality of lens elements define a document viewer focal plane, and said lens element array is characterized by a lens element array frequency $f_0$, where $f_0$, $f_1$, and $f_2$ satisfy at least one of the following document characteristic equations $$f_1 \equiv af_0$$

$$f_2 \equiv bf_0$$

$$f_0 \equiv cf_1$$

$$f_0 \equiv df_2$$

where a, b, c, and d are positive whole numbers and where a b and c d; and a document receiving station positioned to receive said document such that said document may be positioned substantially in said document viewer focal plane.

* * * * *

UNITED STATES PATENT AND TRADEMARK OFFICE

CERTIFICATE OF CORRECTION

PATENT NO. : 6,301,363 B1
DATED : October 9, 2001
INVENTOR(S) : Mowry, Jr.

It is certified that error appears in the above-identified patent and that said Letters Patent is hereby corrected as shown below:

<u>Column 2,</u>
Line 31, reads as "ab cd" should read -- $a \neq b$ $c \neq d$ --

<u>Column 3,</u>
Line 39, reads as "ab cd" should read -- $a \neq b$ $c \neq d$ --

<u>Column 7,</u>
Line 55, reads as "ab cd" should read -- $a \neq b$ $c \neq d$ --
Line 61, reads as "symbols $\equiv$ and" should read -- symbols $\equiv$ and $\neq$ --

<u>Column 11,</u>
Line 67, reads as "ab cd" should read -- $a \neq b$ $c \neq d$ --

<u>Column 13,</u>
Line 50, reads as "ab cd" should read -- $a \neq b$ $c \neq d$ --

<u>Column 18,</u>
Line 30, reads as "ab cd" should read -- $a \neq b$ $c \neq d$ --

Signed and Sealed this

Eleventh Day of June, 2002

*Attest:*

JAMES E. ROGAN

*Attesting Officer* *Director of the United States Patent and Trademark Office*